(12) United States Patent
Kanamori et al.

(10) Patent No.: US 10,202,110 B2
(45) Date of Patent: Feb. 12, 2019

(54) AIR DETECTOR AND AIR DETECTING METHOD

(71) Applicants: TOYOTA JIDOSHA KABUSHIKI KAISHA, Toyota-shi, Aichi-ken (JP); ADVICS CO., LTD., Kariya, Aichi-pref. (JP)

(72) Inventors: Katsuhiro Kanamori, Aichi-gun (JP); Kazutaka Noro, Chiryu (JP)

(73) Assignees: TOYOTA JIDOSHA KABUSHIKI KAISHA, Toyota (JP); ADVICS CO., LTD., Kariya (JP)

(*) Notice: Subject to any disclaimer, the term of this patent is extended or adjusted under 35 U.S.C. 154(b) by 331 days.

(21) Appl. No.: 15/186,667

(22) Filed: Jun. 20, 2016

(65) Prior Publication Data

US 2017/0008502 A1 Jan. 12, 2017

(30) Foreign Application Priority Data

Jul. 6, 2015 (JP) .................................. 2015-135569

(51) Int. Cl.
*B60T 11/30* (2006.01)
*B60T 17/22* (2006.01)
(Continued)

(52) U.S. Cl.
CPC ............ *B60T 17/22* (2013.01); *B60T 8/4077* (2013.01); *B60T 11/16* (2013.01); *B60T 11/30* (2013.01);
(Continued)

(58) Field of Classification Search
CPC .... B60T 13/686; B60T 13/662; B60T 13/745; B60T 11/30; B60T 11/16; B60T 17/221; B60T 13/146; B60T 8/4077; B60T 17/22
See application file for complete search history.

(56) References Cited

U.S. PATENT DOCUMENTS 9,346,442 B2 * 5/2016 Kamiya ................. B60T 7/042
2003/0090149 A1 5/2003 Kusano et al.
(Continued)

FOREIGN PATENT DOCUMENTS

JP 2005-254898 A 9/2005
JP 2006-313148 A 11/2006
(Continued)

Primary Examiner — Abiy Teka
(74) Attorney, Agent, or Firm — Oliff PLC (57) ABSTRACT

A hydraulic braking system includes: a master cylinder including a pressurizing piston, a rearward chamber, and a pressure chamber; and a rearward-hydraulic-pressure controller connected to the rearward chamber and including a pressure increase valve and a regulator for controlling a hydraulic pressure in an output chamber. An air detector includes: an upstream detector, including the rearward-hydraulic-pressure controller, for detecting presence or absence of air in an upstream portion based on a relationship between the hydraulic pressure in the output chamber and an open time of the pressure increase valve; and a downstream detector for detecting presence or absence of air in a downstream portion based on a relationship between a stroke of the pressurizing piston and the hydraulic pressure in the output chamber. The downstream portion includes a portion located downstream of the pressure chamber of the master cylinder.

7 Claims, 6 Drawing Sheets (51) Int. Cl.
  *B60T 8/40* (2006.01)
  *B60T 13/14* (2006.01)
  *B60T 13/66* (2006.01)
  *B60T 11/16* (2006.01)
  *B60T 8/34* (2006.01)

(52) U.S. Cl.
  CPC .......... *B60T 13/146* (2013.01); *B60T 13/662* (2013.01); *B60T 17/221* (2013.01); *B60T 8/34* (2013.01)

(56) References Cited

U.S. PATENT DOCUMENTS

| | | | |
|---|---|---|---|
| 2009/0210124 A1* | 8/2009 | Schonlau | B60T 8/38 701/70 |
| 2015/0120161 A1 | 4/2015 | Kamiya et al. | |
| 2015/0175145 A1* | 6/2015 | Nakata | B60T 11/16 188/352 |
| 2016/0039402 A1 | 2/2016 | Kamiya et al. | |
| 2016/0046274 A1* | 2/2016 | Matsuura | B60T 17/22 701/34.4 |

FOREIGN PATENT DOCUMENTS

| | | |
|---|---|---|
| JP | 2013-208987 A | 10/2013 |
| JP | 2014-213755 A | 11/2014 |
| WO | 2014/157327 A1 | 10/2014 |

* cited by examiner

AIR DETECTOR AND AIR DETECTING METHOD

CROSS REFERENCE TO RELATED APPLICATION

The present application claims priority from Japanese Patent Application No. 2015-135569, which was filed on Jul. 6, 2015, the disclosure of which is herein incorporated by reference in its entirety.

BACKGROUND

Technical Field

The following disclosure relates to detection of the presence or absence of air in a hydraulic braking system.

Description of the Related Art

Patent Document 1 (Japanese Patent Application Publication No. 2013-208987) and Patent Document 2 (Japanese Patent Application Publication No. 2014-213755) disclose hydraulic braking systems including: a master cylinder; a rearward-hydraulic-pressure controller connected to a rearward chamber formed behind a pressurizing piston in the master cylinder; and a brake cylinder connected to a pressure chamber formed in front of the pressurizing piston. The rearward-hydraulic-pressure controller includes: a high pressure source including a pump device and an accumulator; and a regulator configured to use a hydraulic pressure produced by the high pressure source to control a hydraulic pressure in an output chamber to a hydraulic pressure having a magnitude related to a hydraulic pressure in an input chamber. Patent Document 2 discloses an air detector configured to detect the presence or absence of air in the rearward-hydraulic-pressure controller based on a hydraulic pressure in the accumulator. The pump device is driven after air bleeding. In the case where the hydraulic pressure in the accumulator when a set length of time is elapsed is lower than a determination threshold value, it is determined that air exists.

SUMMARY

Accordingly, an aspect of the disclosure relates to a technique of satisfactorily detecting the presence or absence of air in a hydraulic braking system including a rearward-hydraulic-pressure controller.

An air detector according to the present disclosure includes: an upstream detector configured to detect presence or absence of air in an upstream portion including a rearward-hydraulic-pressure controller connected to a rearward chamber formed at a rear of a pressurizing piston in a master cylinder; and a downstream detector configured to detect presence or absence of air in a downstream portion including a pressure chamber in the master cylinder. With this configuration, the presence or absence of air is detected in each of the upstream portion and the downstream portion. Accordingly, when the presence of air is detected, it is possible to identify in which one of the upstream portion and the downstream portion air exists.

CLAIMABLE INVENTIONS

There will be described by way of examples inventions recognized to be claimable by the present applicant or features of the inventions.

(1) An air detector configured to detect presence or absence of air in a hydraulic braking system,
wherein the hydraulic braking system comprises:
  a master cylinder comprising a housing, a pressurizing piston fluid-tightly and slidably fitted in the housing, a rearward chamber provided at a rear of the pressurizing piston, and a pressure chamber provided in front of the pressurizing piston; and
  a rearward-hydraulic-pressure controller connected to the rearward chamber,
wherein the rearward-hydraulic-pressure controller comprises:
  a regulator configured to control a hydraulic pressure in an output chamber connected to the rearward chamber, to a hydraulic pressure having a magnitude related to at least one of a hydraulic pressure in an input chamber and a hydraulic pressure in the pressure chamber; and
  an input hydraulic pressure controller comprising a pressure increase valve provided between the input chamber and a high pressure source, and
wherein the air detector comprises:
  an upstream detector configured to detect presence or absence of air in an upstream portion based on a relationship between an open time and the hydraulic pressure in the output chamber, the upstream portion comprising the rearward-hydraulic-pressure controller, the open time being a length of time in which the pressure increase valve is in an open state; and
  a downstream detector configured to detect presence or absence of air in a downstream portion based on a relationship between a stroke of the pressurizing piston and the hydraulic pressure in the output chamber, the downstream portion comprising a portion located downstream of the pressure chamber of the master cylinder.

The open time is a length of time in which an electromagnetic valve as the pressure increase valve is kept in the open state. This open time starts from a point in time when the pressure increase valve is switched from a closed state to the open state. In other words, the open time is a length of time elapsed from a point in time when control of the hydraulic pressure in the input chamber is started when detecting the presence or absence of air. The regulator may include a poppet valve and may include a spool.

(2) The air detector according to the above form (1),
wherein the regulator comprises a first movable member movable by the hydraulic pressure in the input chamber,
wherein the input hydraulic pressure controller comprises a pressure reduction valve provided between the input chamber and a low pressure source, and
wherein the upstream detector comprises an electromagnetic valve controller configured to establish a closed state of the pressure reduction valve and the open state of the pressure increase valve.

Control of the pressure increase valve and the pressure reduction valve controls the hydraulic pressure in the input chamber to control the hydraulic pressure in the output chamber. When the pressure increase valve is switched to the open state, and a hydraulic pressure produced by the high pressure source is supplied to the input chamber, the first movable member is moved to increase the hydraulic pressure in the output chamber.

(3) The air detector according to the above form (1) or (2), wherein the upstream detector comprises an upstream air-presence detector configured to detect air in the upstream portion in at least one of (a) a case where the open time when the hydraulic pressure in the output chamber has reached a predetermined first set pressure is greater than or equal to an air-presence determination time and (b) a case where the hydraulic pressure in the output chamber when the open time has reached a predetermined set length of time is less than a first air-presence determination pressure.

The hydraulic pressure in the output chamber increases with increase in the open time of the pressure increase valve. In the case where air is in the upstream portion, however, increase in the hydraulic pressure in the output chamber delays with respect to the open time. By using this phenomenon, the presence or absence of air in the upstream portion can be detected. In the air detector according to this form, the presence or absence of air in the upstream portion is detected based on the presence or absence of delay in increase in the hydraulic pressure in the output chamber due to air, that is, the presence or absence of air is detected based on a dynamic changing state of the hydraulic pressure in the output chamber.

(4) The air detector according to any one of the above forms (1) through (3), wherein the downstream detector comprises a downstream air-presence detector configured to detect air in the downstream portion in each of (i) a case where the stroke of the pressurizing piston when the hydraulic pressure in the output chamber has reached a predetermined second set pressure is greater than an air-presence determination stroke and (ii) a case where the hydraulic pressure in the output chamber when the stroke of the pressurizing piston has reached a predetermined set stroke is less than a second air-presence determination pressure.

The regulator may include a second movable member movable by the hydraulic pressure in the pressure chamber. The second movable member is moved by the hydraulic pressure in the pressure chamber, and the hydraulic pressure in the output chamber is increased. A predetermined relationship is established between the hydraulic pressure in the pressure chamber and the hydraulic pressure in the output chamber. In the master cylinder, a predetermined relationship is established between the stroke of the pressurizing piston and the hydraulic pressure in the pressure chamber. Accordingly, a predetermined relationship is established between the hydraulic pressure in the output chamber and the stroke of the pressurizing piston. In the case where there is air in the downstream portion, in contrast, the hydraulic pressure in the output chamber is low with respect to the stroke of the pressurizing piston. By using this phenomenon, the presence or absence of air in the downstream portion can be detected. In the air detector according to this form, the presence or absence of air in the downstream portion is detected using a static relationship between the stroke of the pressurizing piston and the hydraulic pressure in the output chamber. It is noted that the air detector according to this form is effective in the case where no detector is provided for detecting the hydraulic pressure in the pressure chamber or the brake cylinder.

(5) The air detector according to any one of the above forms (1) through (4), wherein the downstream detector is configured to detect the presence or absence of air in the downstream portion when the upstream detector detects no air in the upstream portion.

(6) The air detector according to any one of the above forms (1) through (5),
wherein the hydraulic braking system comprises:
at least one brake cylinder connected to the pressure chamber; and
a communication isolator provided between the pressure chamber and the at least one brake cylinder,
wherein the upstream detector is configured to detect the presence or absence of air in the upstream portion in a state in which the pressure chamber and the at least one brake cylinder are isolated from each other by the communication isolator, and
wherein the downstream detector is configured to detect the presence or absence of air in the downstream portion in a state in which the pressure chamber and the at least one brake cylinder are communicated with each other by the communication isolator.

By isolating the pressure chamber from the at least one brake cylinder by the communication isolator, it is possible to stably detect the hydraulic pressure in the output chamber and accurately detect the presence or absence of air in the upstream portion when compared with the case where the pressure chamber communicates with the at least one brake cylinder.

(7) The air detector according to any one of the above forms (1) through (6),
wherein the communication isolator comprises at least one pressure holding valve, each of which is an electromagnetic valve provided between the pressure chamber and a corresponding one of the at least one brake cylinder, and
wherein each of the at least one pressure holding valve is an element of a slip controller configured to control a hydraulic pressure in a corresponding one of the at least one brake cylinder based on a slip state of a corresponding wheel.

(8) An air detector configured to detect presence or absence of air in a rearward-hydraulic-pressure controller connected to a rearward chamber provided at a rear of a pressurizing piston in the master cylinder,
wherein the rearward-hydraulic-pressure controller comprises:
first movable member movable by a hydraulic pressure in an input chamber;
a first output hydraulic pressure controller configured to increase a hydraulic pressure in an output chamber connected to the rearward chamber, with forward movement of the first movable member; and
a pressure increase valve provided between the input chamber and a high pressure source, and
wherein the air detector comprises an upstream detector configured to detect presence or absence of air in an upstream portion based on a relationship between an open time of the pressure increase valve and the hydraulic pressure in the output chamber, the upstream portion comprising the rearward-hydraulic-pressure controller.

The air detector according to this form may incorporate the technical feature according to any one of the above forms (1) through (7).

(9) An air detector configured to detect presence or absence of air in a hydraulic braking system,
wherein the hydraulic braking system comprises:
a master cylinder comprising a pressurizing piston, a rearward chamber provided at a rear of the pressurizing piston, and a pressure chamber provided in front of the pressurizing piston; and
a rearward-hydraulic-pressure controller connected to the rearward chamber,
wherein the rearward-hydraulic-pressure controller comprises:
a second output hydraulic pressure controller configured to control a hydraulic pressure in an output chamber connected to the rearward chamber, to a hydraulic pressure having a magnitude related to a hydraulic pressure in the pressure chamber; and wherein the air detector comprises a downstream detector configured to detect presence or absence of air in a downstream portion based on a relationship between a stroke of the pressurizing piston and the hydraulic pressure in the output chamber, the downstream portion comprising a portion located downstream of the rearward chamber of the master cylinder.

The air detector according to this form may incorporate the technical feature according to any one of the above forms (1) through (7).

(10) An air detector configured to detect presence or absence of air in a hydraulic braking system, wherein the hydraulic braking system comprises:
a master cylinder comprising a housing and a pressurizing piston fluid-tightly and slidably fitted in the housing, a pressure chamber being formed in front of the pressurizing piston and connected to at least one brake cylinder, and a rearward chamber being formed at a rear of the pressurizing piston;
a rearward-hydraulic-pressure controller connected to the rearward chamber of the master cylinder; and
a communication isolator provided between the pressure chamber and the at least one brake cylinder, and wherein the air detector comprises:
an upstream detector configured to detect presence or absence of air in an upstream portion in a state in which the at least one brake cylinder and the pressure chamber are isolated from each other by the communication isolator, the upstream portion comprising the rearward-hydraulic-pressure controller; and
a downstream detector configured to detect presence or absence of air in a downstream portion in a state in which the pressure chamber and the at least one brake cylinder are communicated with each other by the communication isolator, the downstream portion comprising a portion located downstream of the pressure chamber of the master cylinder.

The air detector according to this form may incorporate the technical feature according to any one of the above forms (1) through (9).

(11) An air detecting method of detecting presence or absence of air in a hydraulic braking system, wherein the hydraulic braking system comprises:
a master cylinder comprising a housing and a pressurizing piston fluid-tightly and slidably fitted in the housing, a pressure chamber being formed in front of the pressurizing piston and connected to at least one brake cylinder, and a rearward chamber being formed at a rear of the pressurizing piston;
a rearward-hydraulic-pressure controller connected to the rearward chamber of the master cylinder; and
a communication isolator provided between the pressure chamber and the at least one brake cylinder, and wherein the air detecting method comprises:
an upstream detecting step of detecting presence or absence of air in the rearward-hydraulic-pressure controller in a state in which the at least one brake cylinder and the pressure chamber are isolated from each other by the communication isolator; and
a downstream detecting step of, after completion of the upstream detecting step, detecting presence or absence of air on a downstream side of the pressure chamber of the master cylinder in a state in which the pressure chamber and the at least one brake cylinder are communicated with each other by the communication isolator.

The air detecting method according to this form is implementable in the air detector according to any one of the above forms (1) through (10).

(12) The air detecting method according to the above form (11), wherein the downstream detecting step is a step of detecting the presence or absence of air in the downstream portion when no air is detected in the upstream portion in the upstream detecting step.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

DETAILED DESCRIPTION OF THE EMBODIMENT

Hereinafter, there will be described a hydraulic braking system including an air detector according to one embodiment by reference to the drawings.

Configuration of Hydraulic Braking System

Figure 1:
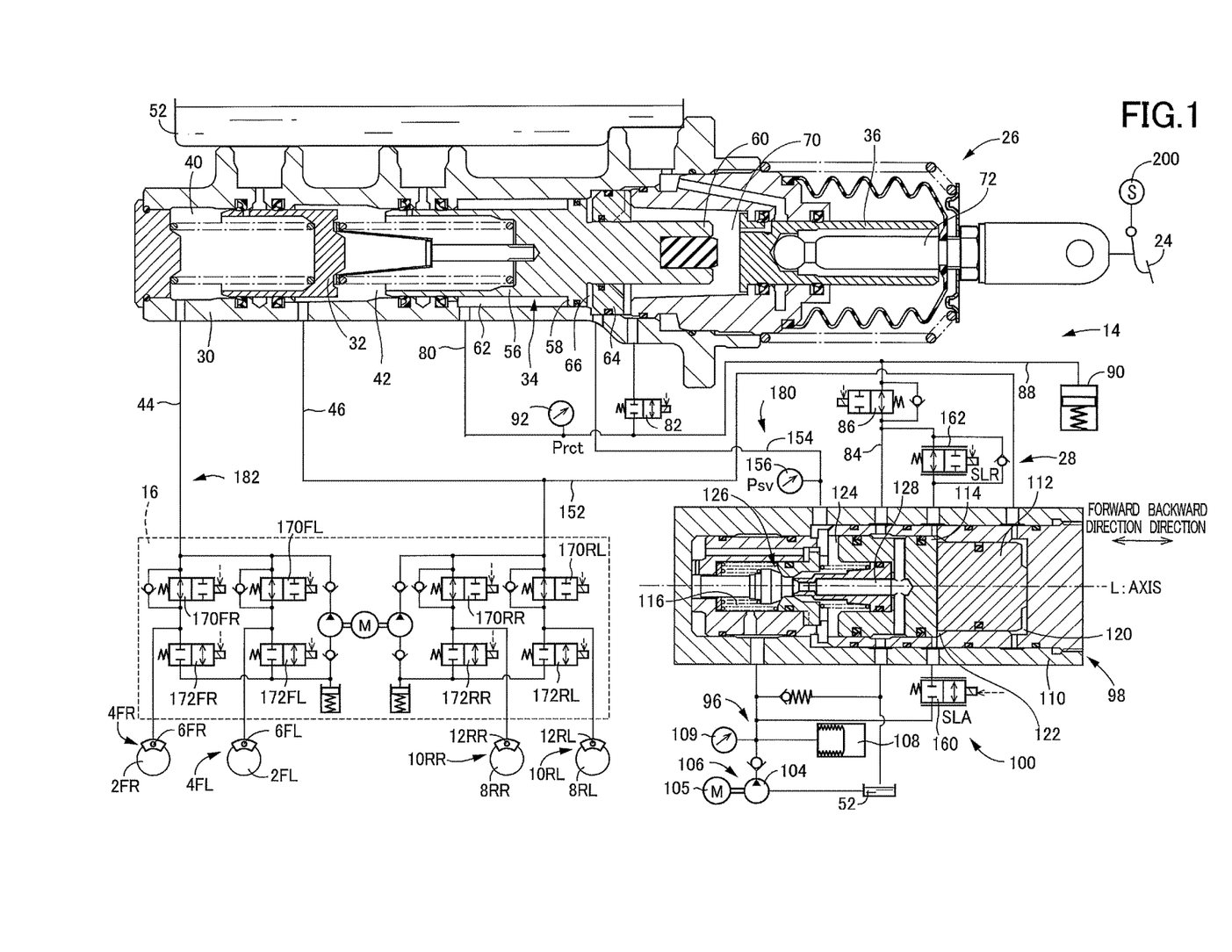
FIG. 1 is a circuit diagram of a hydraulic braking system including an air detector according to one embodiment, in which an air detecting method is implemented.

As illustrated in FIG. 1, the hydraulic brake system includes (i) brake cylinders 6FL, 6FR of hydraulic brakes 4FL, 4FR respectively provided for front left and right wheels 2FL, 2FR, and brake cylinders 12RL, 12RR of hydraulic brakes 10RL, 10RR respectively provided for rear left and right wheels 8RL, 8RR, (ii) a hydraulic-pressure producing device 14 capable of supplying hydraulic pressure to these brake cylinders 6FL, 6FR, 12RL, 12RR, and (iii) a slip control valve device 16 provided between the hydraulic-pressure producing device 14 and the brake cylinders 6FL, 6FR, 12RL, 12RR. Devices such as the hydraulic-pressure producing device 14 and the slip control valve device 16 are controlled by a brake ECU 20 (see FIG. 2) constituted mainly by a computer.

Hydraulic-pressure Producing Device

The hydraulic-pressure producing device 14 includes: a brake pedal 24 as a brake operating member; a master cylinder 26; and a rearward-hydraulic-pressure controller 28 configured to control a hydraulic pressure in a rearward chamber of the master cylinder 26

Master Cylinder

The master cylinder 26 includes a housing 30 and pressurizing pistons 32, 34 and an input piston 36 arranged in line and fluid-tightly and slidably fitted in the housing 30. Pressure chambers 40, 42 are defined in front of the respective pressurizing pistons 32, 34. The brake cylinders 6FL, 6FR provided for the respective front left and right wheels 2FL, 2FR are connected to the pressure chamber 40 by a fluid passage 44, while the brake cylinders 12RL, 12RR provided for the respective rear left and right wheels 8RL, 8RR are connected to the pressure chamber 42 by a fluid passage 46. A hydraulic pressure supplied to each of the brake cylinders 6FL, 6FR, 12RL, 12RR actuates a corresponding one of the hydraulic brakes 4FL, 4FR, 10RL, 10RR to restrain rotation of a corresponding one of the wheels 2FL, 2FR, 8RL, 8RR. In the following description, where the distinction of wheels is not required, each of devices such as the hydraulic brakes may be referred without suffixes (FL, FR, RL, RR) indicative of the corresponding wheels. The pressurizing pistons 32, 34 are urged backward respectively by return springs. When the pressurizing pistons 32, 34 are located at their respective back end positions, the pressure chambers 40, 42 are in communication with a reservoir 52.

The pressurizing piston 34 includes (a) a front piston portion 56 provided in a front portion thereof, (b) an intermediate piston portion 58 provided in an intermediate portion of the pressurizing piston 34 so as to protrude in its radial direction, and (c) a rear small-diameter portion 60 provided in a rear portion of the pressurizing piston 34 and having a smaller diameter than the intermediate piston portion 58. The front piston portion 56 and the intermediate piston portion 58 are fluid-tightly and slidably fitted in the housing 30. A space in front of the front piston portion 56 is the pressure chamber 42, and a space in front of the intermediate piston portion 58 is an annular chamber 62. The housing 30 is provided with an annular inner-circumferential-side protrusion 64, and the rear portion of the intermediate piston portion 58, i.e., the rear small-diameter portion 60 is fluid-tightly and slidably fitted in the inner-circumferential-side protrusion 64. As a result, a rearward chamber 66 is formed at a rear of the intermediate piston portion 58 and between the intermediate piston portion 58 and the inner-circumferential-side protrusion 64. The input piston 36 is located at a rear of the pressurizing piston 34, and a separated chamber 70 is defined between the rear small-diameter portion 60 and the input piston 36. The brake pedal 24 is engaged with a rear portion of the input piston 36 by an operating rod 72 and other components.

The annular chamber 62 and the separated chamber 70 are connected to each other by a connecting passage 80. A communication control valve 82 is provided in the connecting passage 80. The communication control valve 82 is a normally-closed electromagnetic open/close valve. A portion of the connecting passage 80 which is located on one of opposite sides of the communication control valve 82 which is nearer to the annular chamber 62 is connected to the reservoir 52 by a reservoir passage 84 in which a reservoir cut-off valve 86 is provided. The reservoir cut-off valve 86 is a normally-open electromagnetic open/close valve. A stroke simulator 90 is connected, by a simulator passage 88, to the portion of the connecting passage 80 which is located on one of opposite sides of the communication control valve 82 which is nearer to the annular chamber 62. The stroke simulator 90 is connected to the separated chamber 70 by the simulator passage 88 and the connecting passage 80. A hydraulic pressure sensor 92 is provided in a portion of the connecting passage 80 which is located on one of opposite sides of the portion thereof to which the reservoir passage 84 is connected, and the one of opposite sides is nearer to the annular chamber 62. The hydraulic pressure sensor 92 detects a hydraulic pressure in the annular chamber 62 and the separated chamber 70 in a state in which the annular chamber 62 and the separated chamber 70 are in communication with each other and isolated from the reservoir 52. The hydraulic pressure in the annular chamber 62 and the separated chamber 70 has a magnitude related to an operating force of the brake pedal 24. Accordingly, the hydraulic pressure sensor 92 can be referred to as "operation-related hydraulic sensor".

Rearward-hydraulic-pressure Controller

The rearward-hydraulic pressure controller 28 is connected to the rearward chamber 66. The rearward-hydraulic pressure controller 28 includes a high pressure source 96, a regulator 98, and an input hydraulic pressure controller 100. The high pressure source 96 includes: a pump device 106 including a pump 104 and a pump motor 105; an accumulator 108 configured to accumulate working fluid discharged from the pump device 106 in a pressurized state; and an accumulator pressure sensor 109 configured to detect an accumulator pressure which is a hydraulic pressure of the working fluid accumulated in the accumulator 108. The pump device 106 is controlled so as to keep the accumulator pressure within a predetermined range.

The regulator 98 includes a housing 110, and a pilot piston 112 and a control piston 114 provided in the housing 110 so as to be arranged in line in a direction parallel to an axis L. A high pressure chamber 116 is formed in the housing 110 at a position in front of the control piston 114 and connected to the high pressure source 96. A space between the pilot piston 112 and the housing 110 is a pilot pressure chamber 120, a space at a rear of the control piston 114 is an input chamber 122, and a space in front of the control piston 114 is a servo chamber 124 as one example of an output chamber. Also, a high-pressure supply valve 126 is provided between the servo chamber 124 and the high pressure chamber 116. A high-pressure supply valve 126 is a normally closed valve that normally isolates the servo chamber 124 and the high pressure chamber 116 from each other. A low-pressure passage 128 extending parallel with the axis L is formed in a central portion of the control piston 114 so as to always communicate with the reservoir 52. The low-pressure passage 128 is open in a front end portion of the control piston 114 and opposed to the high-pressure supply valve 126. Thus, when the control piston 114 is located at it back end position, the servo chamber 124 is isolated from the high pressure chamber 116 and communicates with the reservoir 52 via the low-pressure passage 128. When the control piston 114 is moved forward, the high-pressure supply valve 126 is opened, and the servo chamber 124 is isolated from the reservoir 52 and communicates with the high pressure chamber 116.

It is noted that the pilot pressure chamber 120 is connected to the fluid passage 46 by a pilot passage 152. Thus, a hydraulic pressure in the pressure chamber 42 of the master cylinder 26 acts on the pilot piston 112. The rearward chamber 66 of the master cylinder 26 is connected to the servo chamber 124 by a servo passage 154. Since the servo chamber 124 and the rearward chamber 66 are directly connected to each other, the hydraulic pressure in the servo chamber 124 as a servo pressure and the hydraulic pressure in the rearward chamber 66 are principally equal to each other. It is noted that a servo pressure sensor 156 is provided in the servo passage 154 to detect the servo pressure. The input hydraulic pressure controller 100 including a pressure-increasing linear valve (SLA) 160 and a pressure-reduction linear valve (SLR) 162 is connected to the input chamber 122. The pressure-increasing linear valve 160 is one example of a pressure increase valve, and the pressure-reduction linear valve 162 is one example of a pressure reduction valve. The pressure-increase linear valve 160 is provided between the input chamber 122 and the high pressure source 96. The pressure-reduction linear valve 162 is provided between the input chamber 122 and the reservoir 52. Currents supplied to a coil of the pressure-increase linear valve 160 and a coil of the pressure-reduction linear valve 162 are controlled to control a hydraulic pressure in the input chamber 122 (hereafter may be referred to as "input hydraulic pressure").

Slip-control Valve Device

The slip-control valve device 16 includes: pressure holding valves 170FR, 170FL, 170RR, 170RL, each of which is an electromagnetic valve provided between a corresponding one of the brake cylinders 6FR, 6FL, 12RR, 12RL and a corresponding one of the pressure chambers 40, 42; and pressure reduction valves 172FR, 172FL, 172RR, 172RL, each of which is an electromagnetic valve provided between a corresponding one of the brake cylinders 6FR, 6FL, 12RR, 12RL and a corresponding one of pressure reduction reservoirs. Individual control of the pressure holding valves 170FR, 170FL, 170RR, 170RL and the pressure reduction valves 172FR, 172FL, 172RR, 172RL individually controls a hydraulic pressure in the brake cylinders 6FR, 6FL, 12RR, 12RL, resulting in establishment of an appropriate slip state of each of the wheels 2FR, 2FL, 8RR, 8RL.

Brake ECU

Figure 2:
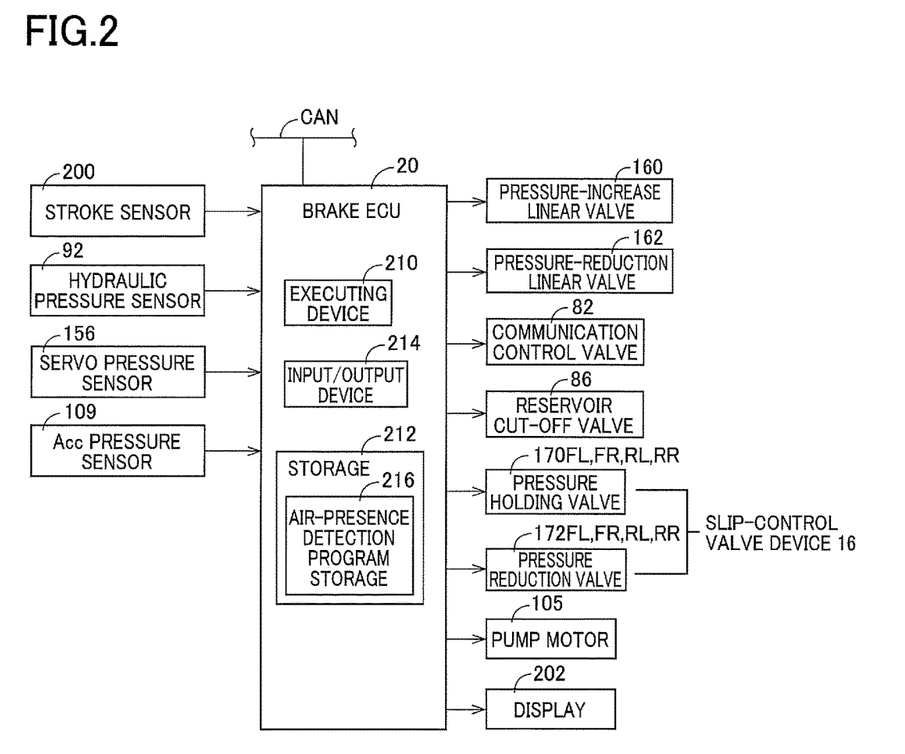
FIG. 2 is a view illustrating a brake ECU of the hydraulic braking system and devices connected to the brake ECU.

As illustrated in FIG. 2, devices connected to the brake ECU 20 include: the operation hydraulic pressure sensor 92; the accumulator pressure sensor 109; the servo pressure sensor 156; a stroke sensor 200 configured to detect a stroke of the brake pedal 24 (hereinafter may be referred to as "operating stroke"); the communication control valve 82; the reservoir cut-off valve 86; the pressure-increase linear valve 160; the pressure-reduction linear valve 162; the slip-control valve device 16; the pump motor 105; and a display 202 as a notifying device. The brake ECU 20 is constituted mainly by a computer including an executing device 210, a storage 212, and an input/output device 214. The storage 212 includes an air-presence detection program storage 216 that stores an air-presence detection program illustrated in the flow chart in FIG. 3.

Operations in Hydraulic Braking System

When the brake pedal 24 is depressed, the hydraulic brakes 4, 10 are actuated. The input hydraulic pressure controller 100 is controlled to increase the hydraulic pressure in the input chamber 122 in the regulator 98. The input hydraulic pressure in the input chamber 122 moves the control piston 114 forward, which switches the high-pressure supply valve 126 to its open state. The servo pressure in the servo chamber 124 is increased by this switch and supplied to the rearward chamber 66. As a result, the pressurizing piston 34 is moved forward in the master cylinder 26, so that a hydraulic pressure is generated in the pressure chambers 40, 42. This hydraulic pressure is supplied to the brake cylinders 6, 12 to actuate the hydraulic brakes 4, 10. As thus described, the control of the input hydraulic pressure controller 100 controls the hydraulic pressure in the brake cylinders 6, 12 such that the hydraulic pressure in the brake cylinders 6, 12, i.e., the hydraulic pressure in the pressure chambers 40, 42 is brought closer to a target hydraulic pressure that is determined based on a state of the brake pedal 24 operated by the driver. In the present embodiment, the master cylinder 26 and the regulator 98 are designed such that the input hydraulic pressure, the servo pressure, and the hydraulic pressure in the pressure chambers 40, 42 are substantially equal to each other in a static state.

Detection of Presence or Absence of Air

In a repair and check factory, for example, the presence or absence of air in the present hydraulic braking system is detected. The presence or absence of air is detected by operation of the regulator 98 using a hydraulic pressure in the high pressure source 96. Thus, in the detection of the presence or absence of air, the pump device 106 is preferably operated such that a hydraulic pressure in the accumulator 108 is greater than or equal to a hydraulic pressure required for the detection of the presence or absence of air. In the present embodiment, the presence or absence of air is detected in each of an upstream portion 180 including the rearward-hydraulic-pressure controller 28, and a downstream portion 182 including the pressure chambers 40, 42 and the brake cylinders 6, 12.

(1) Detection of Presence or Absence of Air in Upstream Portion 180

Figure 6A:
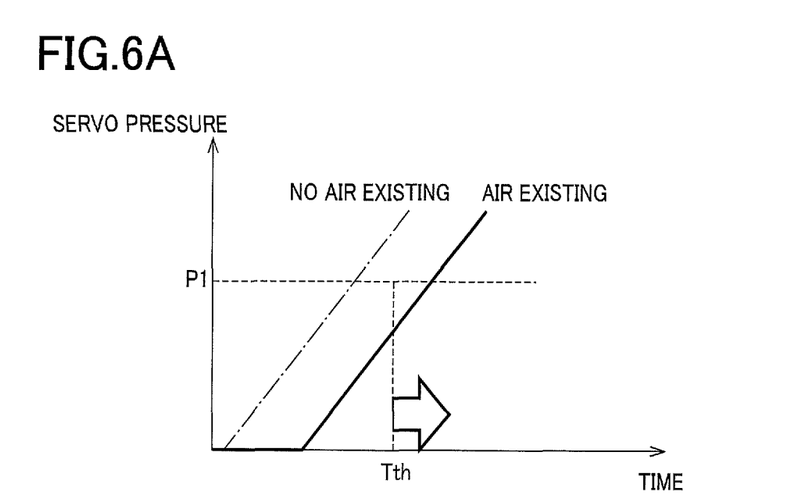
FIG. 6A is a view illustrating a relationship between a servo pressure and a control time in a rearward-hydraulic-pressure controller of the hydraulic braking system.

All the pressure holding valves 170 are switched to their respective closed states, so that the pressure chambers 40, 42 are isolated from the brake cylinders 6, 12. In the input hydraulic pressure controller 100, a closed state of the pressure-reduction linear valve 162 and an open state of the pressure-increase linear valve 160 are established. In the regulator 98, a hydraulic pressure is supplied to the input chamber 122, so that the control piston 114 is moved forward to increase the servo pressure. Here, an open time is a length of time elapsed from the start of operation of the input hydraulic pressure controller 100, in other words, from a point in time when the closed state of the pressure-reduction linear valve 162 and the open state of the pressure-increase linear valve 160 are established. The servo pressure increases with increase in this open time. In the case of no air in the upstream portion 180, however, a predetermined relationship indicated by the one-dot chain line in FIG. 6A is established between the open time and the servo pressure. In the case of detection of the presence or absence of air, for example, a current may be supplied to the pressure-increase linear valve 160 such that an amount of opening of the pressure-increase linear valve 160 becomes a predetermined amount of opening. This amount of opening may be the maximum amount of opening.

In the case where air exists in the upstream portion 180, in contrast, an increase in the servo pressure delays with respect to the open time as indicated by the solid line in FIG. 6A. Thus, in the case where the open time when an actual servo pressure has reached a first set pressure P1 is longer than or equal to an air-presence determination time Tth, for example, it is possible to detect that air exists in the upstream portion 180. For example, the air-presence determination time Tth may be determined at a length of time by which it is possible to determine the presence of air based on, e.g., the amount of opening of the pressure-increase linear valve 160. In the present embodiment as described above, the presence or absence of air in the upstream portion 180 is detected based on the presence or absence of delay in increase in the servo pressure due to the forward movement of the control piston 114, i.e., based on a dynamic change of the servo pressure. Accordingly, effects of air in the pressure chambers 40, 42 of the master cylinder 26 are reduced in the detection of the presence or absence of air in the upstream portion 180.

In the case where the pressure holding valves 170 are open, the hydraulic pressure in the pressure chambers 40, 42 is supplied to the components such as the brake cylinders 6, 12 via the fluid passages 44, 46. This supply may increase fluctuations of a hydraulic pressure in a portion downstream of the pressure chambers 40, 42, leading to increase in effects on the servo pressure. In the case where the pressure holding valves 170 are closed, in contrast, the fluctuations of the hydraulic pressure in the portion downstream of the pressure chambers 40, 42 are small when compared with the case where the pressure holding valves 170 is open, leasing to smaller effects on the servo pressure. As a result, it is possible to accurately detect the presence or absence of air in the upstream portion 180.

(2) Detection of Presence or Absence of Air in Downstream Portion 182

Figure 6B:
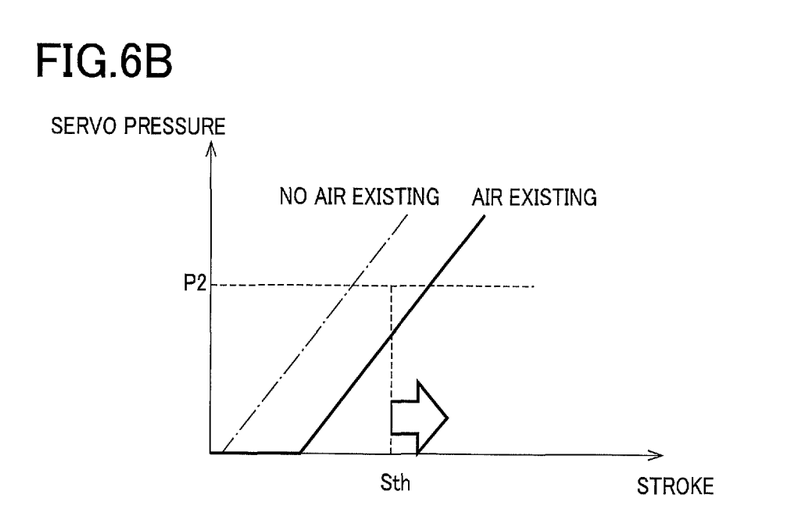
FIG. 6B is a view illustrating a relationship between the servo pressure in the rearward-hydraulic-pressure controller and a stroke of a brake pedal.

The presence or absence of air in the downstream portion 182 is detected in the case where it is detected that no air is in the upstream portion 180. In the detection of the presence or absence of air in the downstream portion 182, all the pressure holding valves 170 are switched to their respective open states to cause each of the brake cylinders 6, 12 to communicate with a corresponding one of the pressure chambers 40, 42. The brake pedal 24 is depressed by an operator. The pressurizing pistons 32, 34 are moved forward in the master cylinder 26 to increase the hydraulic pressure in the pressure chambers 40, 42. The hydraulic pressure in the pressure chamber 42 is supplied to the pilot pressure chamber 120 of the regulator 98 via the fluid passages 46, 152. This supplied hydraulic pressure moves the pilot piston 112 forward in the regulator 98 to advance the control piston 114, resulting in increase in the hydraulic pressure in the servo chamber 124. The servo pressure becomes equal to a hydraulic pressure related to the hydraulic pressure in the pilot pressure chamber 120, i.e., the hydraulic pressure in the pressure chamber 42. In this case, the control of the input hydraulic pressure controller 100 is not performed. The pressure-increase linear valve 160 is closed, and the pressure-reduction linear valve 162 is opened. The input chamber 122 is in communication with the reservoir 52. The hydraulic pressure in the pressure chamber 42 is increased with the forward movement of the brake pedal 24. In the master cylinder 26, a predetermined relationship is established between a stroke of the brake pedal 24 and the hydraulic pressure in the pressure chamber 42. In the regulator 98, a predetermined relationship is established between the hydraulic pressure in the pilot pressure chamber 120 as the hydraulic pressure in the pressure chamber 42 and the hydraulic pressure in the output chamber 124. In view of the above, in the case of no air in the downstream portion 182, a relationship indicated by the one-dot chain line in FIG. 6B is established between the stroke of the brake pedal 24 and the servo pressure. In the case where air exists in the downstream portion 182, in contrast, the servo pressure is low with respect to the stroke as indicated by the solid line in FIG. 6B. In the present embodiment, in the case where the stroke of the brake pedal 24 when the servo pressure has reached a second set pressure P2 is longer than a determination stroke Sth, the presence of air in the downstream portion 182 is detected. For example, the determination stroke Sth may be set at a stroke by which it is possible to determine that air exists based on the second set pressure P2.

It is possible to consider detecting the presence or absence of air in the downstream portion 182 by forward movement of the pressurizing piston 34 which is caused by control of the input hydraulic pressure controller 100. However, when the open state of the pressure-increase linear valve 160 and the closed state of the pressure-reduction linear valve 162 are established in the input hydraulic pressure controller 100, the control piston 114 is quickly moved forward in the regulator 98, which changes the high-pressure supply valve 126 to the open state. As a result, the servo pressure is supplied from the high pressure chamber 116 to the output chamber 124 at a high flow rate and supplied to the rearward chamber 66 at a high flow rate. This supply of the servo pressure increases a speed of forward movement of the pressurizing piston 34. Thus, it is difficult to accurately detect the presence or absence of air in the downstream portion 182 based on a static relationship between the stroke of the pressurizing piston 34 and the servo pressure. In the case where the pressurizing piston 34 is moved forward in response to depression of the brake pedal 24, in contrast, increase in the speed of forward movement of the pressurizing piston 34 can be reduced. Thus, the presence or absence of air in the downstream portion 182 is detected well based on the relationship between the stroke and the servo pressure.

Figure 3:
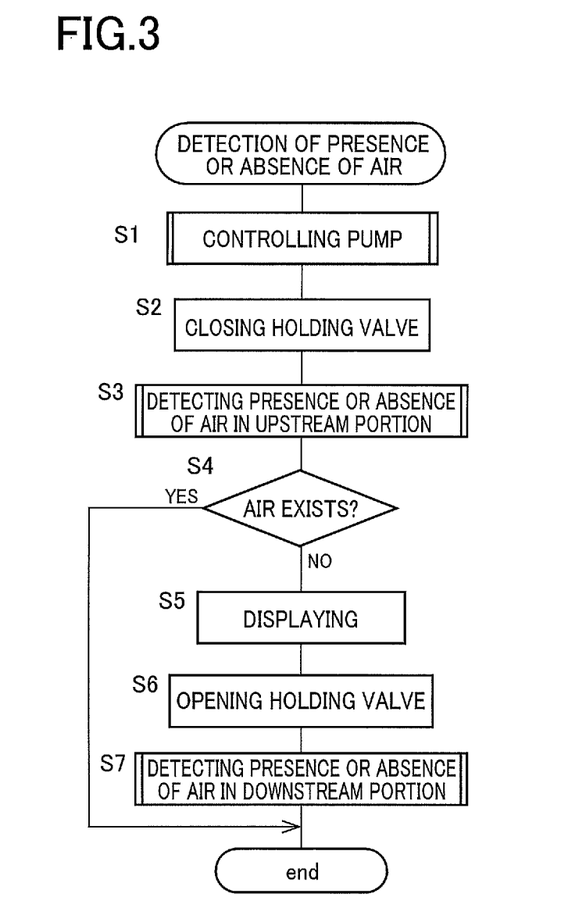
FIG. 3 is a flow chart illustrating an air-presence detection program stored in a storage of the brake ECU.

There will be next explained the detection of the presence or absence of air according to the air-presence detection program illustrated in the flow chart in FIG. 3. The present air-presence detection program is executed when an instruction for detecting the presence or absence of air is output. The instruction for detecting the presence or absence of air may be output when the operator has performed a predetermined operation for an operating member, for example. This flow begins with S1 at which the pump 104 is actuated, and the hydraulic pressure is accumulated in the accumulator 108. In the present embodiment, the accumulator pressure is set to be greater than or equal to a set pressure that is required for detection of the presence or absence of air. In the following processings, the pump device 106 may be continuously operated during the detection of the presence or absence of air, but this operation is not essential. At S2, all the pressure holding valves 170 are switched to their respective closed states. At S3, the presence or absence of air in the upstream portion 180 is detected. At S4, it is determined whether air is in the upstream portion 180 based on a result of the detection. When it is determined that no air is in the upstream portion 180, this information is notified at S5. In the present embodiment, the display 202 displays information about the absence of air in the upstream portion 180. At S6, the pressure holding valves 170 are switched to their respective open state. At S7, the presence or absence of air in the downstream portion 182 is detected. Where it is determined that air is in the upstream portion 180, for example, air bleeding is performed for the upstream portion 180, and thereafter the presence or absence of air in the upstream portion 180 is detected again. When it is determined that no air is in the upstream portion 180 (S4: YES), the presence or absence of air in the downstream portion 182 is detected at S6 and S7.

Figure 4:
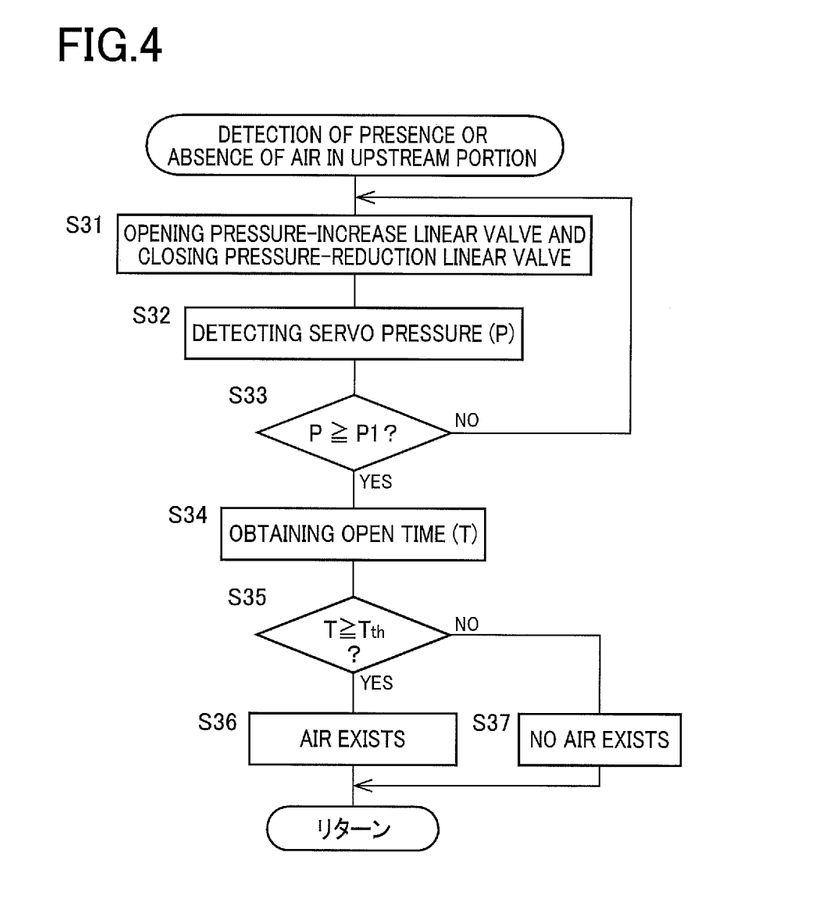
FIG. 4 is a flow chart illustrating a portion of the air-presence detection program (detection of the presence or absence of air in an upstream portion)

The presence or absence of air in the upstream portion 180 is detected according to the flow chart in FIG. 4. This flow chart begins with S31 at which the closed state of the pressure-reduction linear valve (SLR) 162 and the open state of the pressure-increase linear valve (SLA) 160 are established. At S32, the servo pressure is detected by the servo pressure sensor 156. At S33, it is determined whether the servo pressure P has reached the first set pressure P1 (P≥P1). The processings at S31 and S32 are repeated until the servo pressure P reaches the first set pressure P1. When the servo pressure P has reached the first set pressure P1, an open time T is obtained at S34. At S35, it is determined whether the open time T is longer than or equal to the air-presence determination time Tth (T≥Tth). When the open time T is longer than or equal to the air-presence determination time Tth, it is determined at S36 that air is in the upstream portion 180. When the open time T is shorter than the air-presence determination time Tth, it is determined at S37 that no air is in the upstream portion 180. After the processing at S36 or S37, a flag indicating the presence or absence of air is set or reset.

Figure 5:
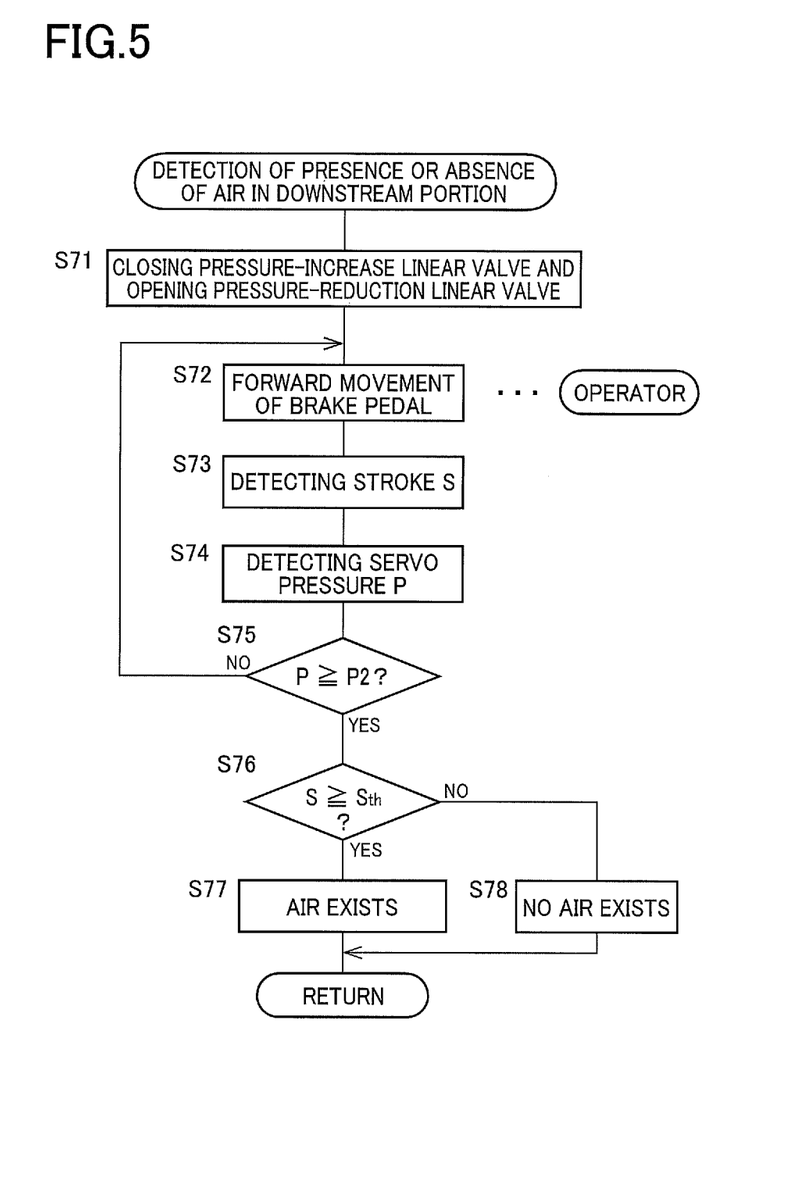
FIG. 5 is a flow chart illustrating another portion of the air-presence detection program (detection of the presence or absence of air in a downstream portion)

The presence or absence of air in the downstream portion 182 is detected according to the flow chart in FIG. 5. In this case, the control of the input hydraulic pressure controller 100 is not executed. This flow begins with S71 at which the closed state of the pressure-increase linear valve (SLA) 160 and the open state of the pressure-reduction linear valve (SLR) 162 are established. At S72, the brake pedal 24 is moved forward. For example, the operator may depress the brake pedal 24 in response to the notification of the information indicating that no air is in the upstream portion 180 at S5. At S73, the stroke of the brake pedal 24, i.e., an amount of forward movement of the brake pedal 24 from its back end position is detected by the stroke sensor 200. At S74, the servo pressure is detected by the servo pressure sensor 156. At S75, it is determined whether the servo pressure has reached the second set pressure P2 (P≥P2). The processings at S72-S74 are repeated until the servo pressure has reaches the second set pressure P2. When the servo pressure has reached the second set pressure P2, a positive decision (YES) is made at S75. At S76, it is determined whether the stroke is greater than or equal to the determination stroke Sth (S≥Sth). When the stroke is greater than or equal to the determination stroke Sth, it is determined at S77 that air is in the downstream portion 182. When the stroke is less than the determination stroke Sth, it is determined at S78 that no air is in the downstream portion 182.

In the present embodiment as described above, in the hydraulic braking system including the rearward-hydraulic-pressure controller 28, the presence or absence of air is detected in each of the upstream portion 180 and the downstream portion 182. This configuration can identify in which one of the upstream portion 180 and the downstream portion 182 air exists. Thus, air bleeding can be efficiently performed in the case where it is determined that air exists. Also, the presence or absence of air in the upstream portion 180 is detected first, and when it is determined that no air is in the upstream portion 180, the presence or absence of air in the downstream portion 182 is detected. This configuration can accurately detect the presence or absence of air in each of the upstream portion 180 and the downstream portion 182. In the hydraulic braking system according to the present embodiment, the presence or absence of air is detected using the servo pressure sensor 156. Thus, the presence or absence of air can be detected well without a sensor for detecting the hydraulic pressure in the pressure chambers 40, 42 or a sensor for detecting the hydraulic pressure in the brake cylinders 6, 12. In other words, the presence or absence of air can be detected without a sensor for detecting the hydraulic pressure in the pressure chambers 40, 42 or a sensor for detecting the hydraulic pressure in the brake cylinders 6, 12.

In the present embodiment, the control piston 114 of the regulator 98 is one example of a first movable member. A first output hydraulic pressure controller is constituted by elements including the first movable member, the output chamber 124, and the input chamber 122. The pilot piston 112 is one example of a second movable member. A second output hydraulic pressure controller is constituted by elements including the second movable member, the control piston 114, the output chamber 124, and the pilot pressure chamber 120. A communication isolator is constituted by elements including the pressure holding valves 170FL, 170FR, 170RL, 170RR. An upstream detector is constituted by, e.g., portions of the brake ECU 20 which store and execute the processings at S2 and S3 in the air-presence detection program indicated by the flow chart in FIG. 3. An upstream air-presence detector is constituted by, e.g., portions of the upstream detector which store and execute the processings at S31-S36. A downstream detector is constituted by, e.g., portions of the brake ECU 20 which store and execute the processings at S6 and S7 in the air-presence detection program indicated by the flow chart in FIG. 3. A downstream air-presence detector is constituted by, e.g., portions of the downstream detector which store and execute the processings at S71-S77. The upstream portion 180 includes the rearward-hydraulic-pressure controller 28 as described above, but it is possible to consider that the upstream portion 180 is constituted by the rearward-hydraulic-pressure controller 28 and that the upstream portion 180 includes not only the rearward-hydraulic-pressure controller 28 but also the servo passage 154 and the rearward chamber 66.

The hydraulic braking system according to the present disclosure is not limited to that according to the present embodiment. For example, the configuration of the rearward-hydraulic-pressure controller 28 is not limited to that in the above-described embodiment. For example, the regulator may include a spool movable by the hydraulic pressure in the input chamber and the pilot pressure (the hydraulic pressure in the pressure chamber). The movement of the spool controls the hydraulic pressure in the output chamber to a hydraulic pressure related to the hydraulic pressure in the input chamber. In the case where the presence or absence of air in the upstream portion 180 is detected, it is not essential to establish the closed state of the pressure holding valves 170.

The detection of the presence or absence of air in the upstream portion 180 and the detection of the presence or absence of air in the downstream portion 182 may be performed separately. For example, the presence or absence of air in the downstream portion 182 may be detected before the detection of the presence or absence of air in the upstream portion 180. Alternatively, the presence or absence of air in the downstream portion 182 may be detected in the case where it is determined that air exists in the upstream portion 180. The presence or absence of air in the downstream portion 182 is detected based on a static relationship between the stroke of the brake pedal 24 and the servo pressure. Thus, the detection of the presence or absence of air in the downstream portion 182 is not easily affected by the presence or absence of air in the upstream portion 180 including the rearward-hydraulic-pressure controller 28. It is to be understood that the disclosure is not limited to the details of the illustrated embodiment, but may be embodied with various changes and modifications, which may occur to those skilled in the art, without departing from the spirit and scope of the disclosure. For example, a sound emitting device may be employed for the notifying device instead of the display 202, for example.

What is claimed is:

1. An air detector configured to detect presence or absence of air in a hydraulic braking system,
wherein the hydraulic braking system comprises:
a master cylinder comprising a housing, a pressurizing piston fluid-tightly and slidably fitted in the housing, a rearward chamber provided at a rear of the pressurizing piston, and a pressure chamber provided in front of the pressurizing piston; and a rearward-hydraulic-pressure controller connected to the rearward chamber, wherein the rearward-hydraulic-pressure controller comprises:

a regulator configured to control a hydraulic pressure in an output chamber connected to the rearward chamber, to a hydraulic pressure having a predetermined relationship to at least one of a hydraulic pressure in an input chamber and a hydraulic pressure in the pressure chamber; and an input hydraulic pressure controller comprising a pressure increase valve provided between the input chamber and a high pressure source, and wherein the air detector comprises:

an upstream detector configured to detect the presence or absence of air in an upstream portion based on a relationship between an open time and the hydraulic pressure in the output chamber, the upstream portion including the rearward-hydraulic-pressure controller, the open time being a length of time in which the pressure increase valve is in an open state; and a downstream detector configured to detect the presence or absence of air in a downstream portion based on a relationship between a stroke of the pressurizing piston and the hydraulic pressure in the output chamber, the downstream portion including a portion located downstream of the pressure chamber of the master cylinder.

2. The air detector according to claim 1, wherein the upstream detector comprises an upstream air-presence detector configured to detect air in the upstream portion in a case where the open time when the hydraulic pressure in the output chamber has reached a predetermined first set pressure is greater than or equal to an air-presence determination time.

3. The air detector according to claim 1, wherein the downstream detector comprises a downstream air-presence detector configured to detect air in the downstream portion in a case where the stroke of the pressurizing piston when the hydraulic pressure in the output chamber has reached a predetermined second set pressure is greater than an air-presence determination stroke.

4. The air detector according to claim 1, wherein the downstream detector is configured to detect the presence or absence of air in the downstream portion when the upstream detector detects no air in the upstream portion.

5. The air detector according to claim 1,
wherein the hydraulic braking system comprises:
at least one brake cylinder connected to the pressure chamber; and
a communication isolator provided between the pressure chamber and the at least one brake cylinder,
wherein the upstream detector is configured to detect the presence or absence of air in the upstream portion in a state in which the pressure chamber and the at least one brake cylinder are isolated from each other by the communication isolator, and wherein the downstream detector is configured to detect the presence or absence of air in the downstream portion in a state in which the pressure chamber and the at least one brake cylinder are communicated with each other by the communication isolator.

6. An air detector configured to detect presence or absence of air in a hydraulic braking system,
wherein the hydraulic braking system comprises:
a master cylinder comprising a housing and a pressurizing piston fluid-tightly and slidably fitted in the housing, a pressure chamber being formed in front of the pressurizing piston and connected to at least one brake cylinder, a rearward chamber being formed at a rear of the pressurizing piston;
a rearward-hydraulic-pressure controller connected to the rearward chamber of the master cylinder; and
a communication isolator provided between the pressure chamber and the at least one brake cylinder, and
wherein the air detector comprises:
an upstream detector configured to detect the presence or absence of air in an upstream portion in a state in which the at least one brake cylinder and the pressure chamber are isolated from each other by the communication isolator, the upstream portion including the rearward-hydraulic-pressure controller; and
a downstream detector configured to detect the presence or absence of air in a downstream portion in a state in which the pressure chamber and the at least one brake cylinder are communicated with each other by the communication isolator, the downstream portion including a portion located downstream of the pressure chamber of the master cylinder.

7. An air detecting method of detecting presence or absence of air in a hydraulic braking system,
wherein the hydraulic braking system comprises:
a master cylinder comprising a housing and a pressurizing piston fluid-tightly and slidably fitted in the housing, a pressure chamber being formed in front of the pressurizing piston and connected to at least one brake cylinder, and a rearward chamber being formed at a rear of the pressurizing piston;
a rearward-hydraulic-pressure controller connected to the rearward chamber of the master cylinder; and
a communication isolator provided between the pressure chamber and the at least one brake cylinder, and
wherein the air detecting method comprises:
an upstream detecting step of detecting the presence or absence of air in the rearward-hydraulic-pressure controller in a state in which the at least one brake cylinder and the pressure chamber are isolated from each other by the communication isolator; and
a downstream detecting step of, after completion of the upstream detecting step, detecting the presence or absence of air on a downstream side of the pressure chamber of the master cylinder in a state in which the pressure chamber and the at least one brake cylinder are communicated with each other by the communication isolator.

* * * * *